United States Patent [19]

Fenn

[11] Patent Number: 4,500,335
[45] Date of Patent: Feb. 19, 1985

[54] COMPOSITION OF MATTER AND METHOD OF USE FOR NITROGEN FERTILIZATION

[75] Inventor: Lloyd B. Fenn, El Paso, Tex.

[73] Assignee: Texas A&M University, College Station, Tex.

[21] Appl. No.: 524,912

[22] Filed: Aug. 19, 1983

Related U.S. Application Data

[63] Continuation-in-part of Ser. No. 221,435, Dec. 30, 1980, abandoned, which is a continuation-in-part of Ser. No. 039,870, May 17, 1979, abandoned.

[51] Int. Cl.³ .............................................. C05C 9/00
[52] U.S. Cl. ........................................ 71/28; 71/36; 71/59; 71/61; 71/63; 71/64.11
[58] Field of Search ................ 71/7, 28, 30, 34, 36, 71/57, 59, 61, 63, 64.11; 564/32, 63

[56] References Cited

U.S. PATENT DOCUMENTS

| | | | |
|---|---|---|---|
| 1,699,254 | 1/1929 | Schwarz | 71/28 X |
| 1,951,518 | 3/1934 | Meiser | 71/28 |
| 1,966,820 | 7/1934 | Jones | 71/9 |
| 2,022,676 | 12/1935 | Kniskern et al. | 71/30 |
| 3,918,952 | 11/1975 | Neumiller | 71/30 X |
| 4,033,746 | 7/1977 | Young | 71/28 X |
| 4,073,633 | 2/1978 | Young | 71/28 |

FOREIGN PATENT DOCUMENTS

| | | | |
|---|---|---|---|
| 690357 | 7/1964 | Canada | 71/28 |
| 2729417 | 7/1978 | Fed. Rep. of Germany | 71/30 |
| 46-10009 | 3/1971 | Japan | 71/30 |
| 816573 | 7/1959 | United Kingdom . | |
| 935999 | 9/1963 | United Kingdom | 260/555 C |
| 1011616 | 12/1965 | United Kingdom | 71/28 |
| 1218176 | 1/1971 | United Kingdom | 71/28 |
| 1366641 | 9/1974 | United Kingdom . | |

OTHER PUBLICATIONS

Fenn and Kissel, "Ammonia Volatilization from Surface Application of Ammonium Compounds on Calcareous Soils: I. General Theory." *Soil Sci. Soc. Amer. Proc.*, 37:855–859, (1973).

*Primary Examiner*—Ferris H. Lander
*Attorney, Agent, or Firm*—Arnold, White & Durkee

[57] ABSTRACT

A method is provided for reducing ammonia volatilization loss from ammoniated fertilizers and urea-containing fertilizers which have been applied to the surface of the soil. The fertilizer is applied in the presence of a water soluble compound that (a) has a saturated solution pH between about 5.0 to about 8.0 and (b) in a hydrolyzing system with the soil and the fertilizer will form carbonates having a solubility above about $10^{-10}$ grams per liter. The amount of the water soluble compound is that which is sufficient to suppress the formation of hydroxyl ions that otherwise would be produced in the soil according to the reaction $$YCO_3 + H_2O \rightleftharpoons Y(OH)_2 + CO_2$$

with Y = calcium or magnesium.

8 Claims, 4 Drawing Figures

○ - UREA
● - UREA + Ca⁺⁺
□ - $NH_4NO_3$

COMPOSITION OF MATTER AND METHOD OF USE FOR NITROGEN FERTILIZATION

CROSS REFERENCE TO RELATED APPLICATIONS

The present application is a continuation-in-part of application Ser. No. 221,435, filed Dec. 30, 1980, which was a continuation-in-part of Ser. No. 039,870, filed May 17, 1979 both now abandoned.

BACKGROUND OF THE INVENTION

It is a well-known fact that urea, because it contains approximately 46% by weight nitrogen, is potentially one of the best sources of nitrogen for fertilizing soils to stimulate plant growth. However, effective use of urea on crops requiring surface fertilization applications has been limited due to high ammonia losses. These losses have been attributed to the influence of the enzyme urease, which in the presence of moisture appears to cause the hydrolysis of urea according to the following reaction:

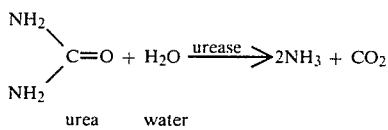
urea   water        (1)

It is now generally accepted, however, that the urea first reacts with the moisture to form ammonium carbonate, as follows:

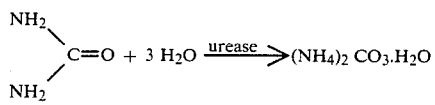        (2)

Ammonium carbonate is a relatively unstable compound, especially in alkaline environments. The compound decomposes according to the following reactions.

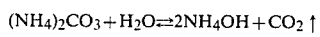        (3)

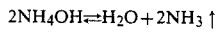        (4)

Since ammonia and carbon dioxide are both gases, they readily volatilize into the atmosphere, thus urging the reactions to continue in the direction of decomposition. It has also been generally recognized that urea applied to a soil surface does not produce serious ammonia loss in the first two days unless soil temperatures exceed 90° F. It is the third and fourth day when the ammonia loss becomes extremely severe. This is due to the fact that the microorganisms that produce the urease enzyme which hydrolyzes the urea must build up, and it generally takes about two days to produce the enzyme. This is because the enzyme is generally produced only when the material it works on, that is, urea, becomes available. When the soil microorganisms have built up sufficient enzyme, the urea is converted to ammonium carbonate according to equation (2). Further breakdown through volatilization of $NH_3$ and $CO_2$ according to equations (3) and (4), is usually inevitable.

Heretofore, the only practical solution to this ammonia volatilization loss was thought to be the rapid soil incorporation of urea-containing compositions so that the decomposition products would be exchanged or otherwise absorbed into the soil. Thus, urea is presently recommended for use as a fertilizer only where it can be "banded" into the soil, that is, applied beneath the soil's surface, or where it can be used with crops that are tilled, so that substantially all the urea is immediately placed beneath the soil's surface. The use of urea is generally not recommended on non-row crops, such as pastures, orchards, timber forests and the like, due to the fact that these crops can only be treated by direct application to the soil surface, as by pellets, solution, aerial spraying, or the like. The rapid volatilization of ammonia from surface-applied urea renders it much less effective as a fertilizer.

It has been suggested by a number of investigators that ammonia volatilization loss from urea fertilizers may be reduced by combining the urea with acid generating compounds. This would tend to produce a lower pH environment around the urea, which in turn would tend to prevent the decomposition of the ammonium carbonate formed upon urea hydrolysis. Young, in U.S. Pat. No. 4,073,633, suggests further that the soil pH on a gross basis need not be changed (indeed, this is quite impractical in many soils), only that of the environment immediately surrounding the urea particles. The patent teaches that "it is essential only that the pH in the immediate environment of the particles be maintained at a neutral or slightly acidic level". Col. 1, lines 59–62. At Col. 2, lines 17–33 there are described a broad list of "acid generators", which are stated to be suitable for combination with urea to reduce surface volatility loss.

Further investigation has proven, however, that the problem of ammonia volatilization loss from surface application of urea to soils is not resolved as simply as the Young patent disclosure would suggest. It appears that the system described by Young retards ammonia loss for a relatively short period, but provides little value where the urea is left on the soil surface for more than two days. Moreover, it also appears that the system works effectively only on soils having a high natural pH. In addition, it appears that many of the "acid-generator" compounds specified in the Young patent are not at all effective in reducing overall ammonia loss. In short, prior to the present invention, the art has remained uncertain as to how to effectively inhibit ammonia volatilization losses from surface applied urea. Despite the obvious value of a fertilizer which could provide 46% by weight nitrogen without any unwanted or unnecessary mineral values, urea continues to be recommended only where it can be promptly directed to beneath the soil's surface.

SUMMARY OF THE INVENTION

The present invention is based upon the utilization of a naturally-occurring chemical buffer mechanism, operating in all soils, wherein the presence of calcium has a substantial effect on soil pH. Generally speaking, whether calcareous or acidic, all soils contain calcium. The calcium may either be retained by the soil particles or is present in organic matter. In sandy soils a large part of the calcium is generally present in the organic matter. My research has confirmed that when this soil calcium is contacted by $CO_2$ or by a carbonate having a more reactive cation (such as ammonium carbonate), the formation of calcium carbonate ($CaCO_3$) tends to occur. This compound is a highly stable one and tends to precipitate, rather than react. Formation of the calcium carbonate then triggers a further reaction whereby calcium hydroxide is produced, as follows:

$$CaCO_3 + H_2O \rightleftharpoons Ca(OH)_2 + CO_2 \qquad (5)$$

A similar buffer mechanism exists between magnesium carbonate and hydroxide. Presence of the hydroxyl ions naturally tends to neutralize any acid conditions and raise the soil pH. It is this buffer mechanism which appears to counteract and eventually overcome the effect of the "acid generators" in retarding ammonia volatilization loss.

According to the present invention, the pH increasing effect of these buffer mechanisms is depressed through the addition of the system of a compound which provides free calcium and/or magnesium ions to replace the soluble calcium and/or magnesium which would otherwise be removed through the precipitation of the insoluble carbonate. This additional calcium/magnesium is provided either in the form of a soluble calcium or magnesium salt or in the form of a compound which produces a cation exchange with the calcium and/or magnesium found in or associated with the soil. The tendency for the soil pH to increase in the presence of carbonate is thus overcome and the soil pH can be maintained at a level which suppresses the decomposition of ammonium carbonate. Moreover, those ammonium cations which may yet be formed during hydrolysis of urea, because they are more reactive than either calcium or magnesium cations, tend to exchange places with those ions and be retained in the soil. In either event, the ammonium ion is no longer available for conversion to free ammonia, and volatilization losses tend to decrease.

The invention thus provides a method of reducing ammonia volatilization loss from surface applied urea fertilizers, particularly any loss after about 24–48 hours following surface application, which comprises applying the urea fertilizer to the soil surface in the presence of an effective amount of a compound which depresses this naturally occurring buffer mechanism. Such compounds may be characterized as those having cations highly soluble in the reactant form but insoluble in the carbonate form. Cations of this type are many, but those contemplated for the present invention are calcium (Ca) and magnesium (Mg), which are readily available, present in most soils, and have no toxic effects. The appropriate compound would have a saturated solution pH between about 5.0 to about 8.0 and, in a hydrolyzing urea system, will form carbonates having a solubility product above about $10^{-10}$ grams per liter. Calcium and magnesium compounds having suitable characteristics include the chlorides, bromides, iodides, nitrites and nitrates. In addition, where calcium and/or magnesium are already available in the soil to be treated, compositions employing sodium (Na) or potassium (K), both of which tend to exchange with the calcium and/or magnesium in the soil to release the ion necessary to repress the action of the buffer, will be acceptable.

The present invention thus achieves what the prior art, including Young, and others, failed to accomplish except for a too brief time, that is, the controlled reduction of soil pH at or near the hydrolyzing urea particles at a level sufficient to minimize the formation of free carbon dioxide and ammonia. The present invention accomplishes this by functioning as a reductant in the release of hydroxyl ions as opposed to adding hydrogen ions to neutralize the alkalinity produced by the hydrolyzed urea. The excess calcium prevents the dissolution of the alkaline calcium carbonate-calcium hydroxide buffer system in response to a buildup of the acidity. The buffer system, in the absence of excess calcium, will maintain the soil pH at or near the range 7.0 to 8.2. With the present invention, it can be reduced to as low as 6.0 and maintained effectively below about 7.0.

DETAILED DESCRIPTION AND PREFERRED EMBODIMENTS

Figure 1:
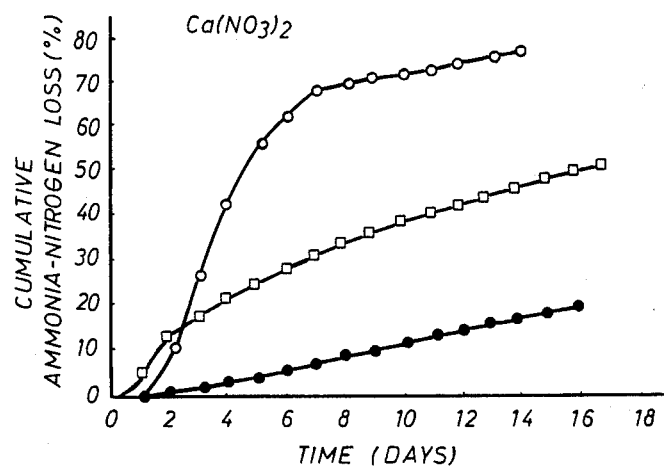
FIG. 1 sets forth the graphic results of ammonia loss from urea and ammonium nitrate surface applied to a Harkey silty clay soil, illustrating the reductive effect of added calcium in three separate forms.
Figure 1:
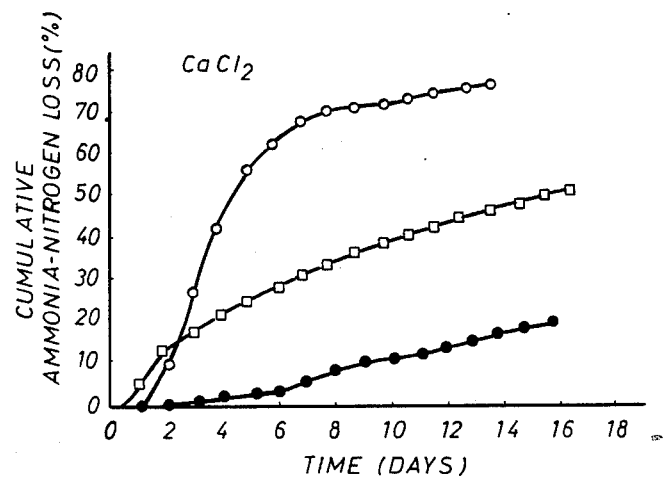
Figure 1:
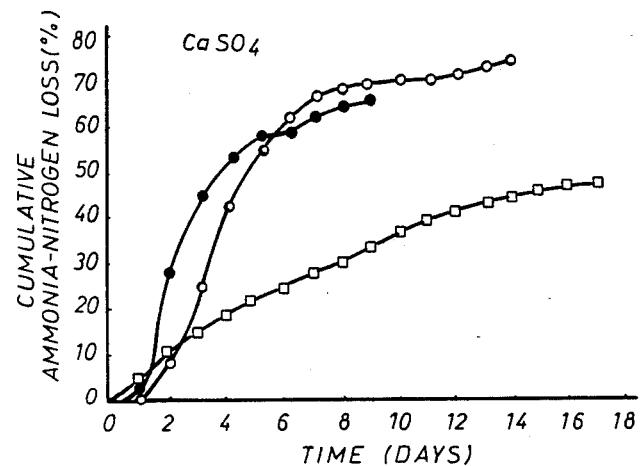

The present invention provides a method of fertilizing with urea to stimulate plant growth in which the urea may be applied directly to and left on the surface of the soil to be fertilized without concern for the loss of nitrogen value from the urea fertilizer through ammonia volatilization caused by breakdown of the urea molecule over time. According to the invention ammonia volatilization loss from surface applied urea fertilizer is substantially lessened by applying the urea fertilizer in combination with from about 0.5 to about 1.0 chemical equivalents per available nitrogen of a soluble neutral salt which reacts upon contact with the soil and in the presence of moisture to provide cations capable of forming essentially insoluble carbonates.

Theoretical Reaction Dynamics

Theoretical reaction dynamics for the method of the present invention will be discussed with focus on calcium as the influential cation. It should be understood that the reaction dynamics also apply when magnesium is the cation. The reaction of significance is as follows:

$$(NH_4)_2CO_3 \cdot H_2O + CaX_2 \rightarrow CaCO_3 \downarrow + 2NH_4X \qquad (6)$$

In the equation, $CaX_2$ represents any suitably soluble calcium salt, as will be explained. The ammonium carbonate will be that produced through hydrolysis of urea according to reaction (2) above. In lime rich soils, certain inorganic ammonium compounds will also generate the production of ammonium carbonate.

The equilibrium of reaction (6) is such that where ammonium carbonate is generated, such as from hydrolysis of urea according to reaction (2), the presence of the soluble calcium salt under appropriate pH conditions will cause the rapid exchange of cations and precipitation of calcium carbonate ($CaCO_3$).

In acid soils initial pH values in the presence of calcium may be too low for calcium carbonate precipitation. Reaction (6) is relatively pH sensitive, and the cation exchange will take place only when the pH is greater than 7. Initial urea hydrolysis, however, will also occur more slowly in an acid environment. Protection against ammonia loss will not be necessary, therefore, until the pH exceeds 7. The continued generation of ammonium carbonate, however, will eventually increase the pH, even though in a highly localized fashion, to greater than 7. This will trigger the exchange of cations and the precipitation of $CaCO_3$ according to reaction (6). The reaction will thereafter proceed rapidly, assuming the presence of sufficient soluble calcium. Where there is insufficient soluble calcium, however, the reaction of equation (6) only exacerbates ammonia volatilization loss. This is because the carbonate precipitation will, in turn, trigger the buffer mechanism of reaction (5) to produce hydroxyl ions, thus further neutralizing the soil pH. The result will be a continuing decomposition of the ammonium carbonate and loss of ammonia according to reactions (3) and (4). The addition of soluble calcium, therefore, becomes an effective ammonia loss surpressing agent in acid soils, by suppressing the effect of reaction (5).

In either acid or calcareous soils, the volatility of ammonia from urea (and certain inorganic ammonium compounds which produce ammonium carbonate in the presence of calcium carbonate) is depressed by the addition of soluble calcium salts through a further mechanism. As the ammonium carbonate is generated through urea hydrolysis, the presence of soluble calcium will convert the ammonia through reaction (6) to more stable products, such as ammonium nitrate and ammonium chloride. Since these two products are both acidic, they also will neutralize some of the alkalinity caused by the production of ammonium carbonate. This means that it will take less than about one equivalent of calcium to suppress ammonia volatilization for each equivalent of urea nitrogen present. In fact, it has been found that as low as about 0.25 equivalents of calcium per equivalent of urea nitrogen or inorganic nitrogen will be acceptable.

It will be noted that the presence of soluble calcium or magnesium salts will have an additional beneficial role, acting to reduce the pH of calcareous soils even before reaction (6) takes effect. The precise mechanism involves precipitation of calcium $CaCO_3$, reduction of soil pH, plus formation of soluble ammonium compounds, such as ammonium nitrate or ammonium chloride, all of which are acidic. The reduction of pH tends to slow down the decomposition of ammonium carbonate through reactions (3) and (4), thereby contributing to reducing the overall $NH_3$ loss potential. In a calcareous soil, $NH_3$ losses from surface broadcast urea are reduced to much lower values than would occur with inorganic compounds such as $NH_4Cl$, $NH_4NO_3$ and MAP, previously thought to have the lowest rates of ammonia loss.

Experiments to Determine Effect On Soil

To illustrate the significant results on various soils produced by the present invention, a series of experiments was conducted. Urea, ammonium sulfate and ammonium nitrate were each surface applied at a rate of 550 kg of ammonia nitrogen per hectare at 32° C. to samples of three different soils: one calcareous (Harkey sicl) and two acidic (Darco fs and Beaumont clay). Native soil pH values were measured. All soils were oven dried. One percent organic matter (blue grass clippings) was added, the pH again determined and the soils placed 2.5 cm deep on a leached sand saturated with distilled water. Calcium carbonate was adjusted to 15% by weight in the Harkey sicl; the two other soils were not limed. The fertilizer was added to the surface of the three soils, first alone, and in a separate study, with a chemically equivalent ratio of a calcium or magnesium salt. Where the fertilizer was added with the salt, the mixture was surface applied to the soil as a liquid containing approximately 9% by weight nitrogen ($NH_4$ or $NH_2$ nitrogens). The calcium and magnesium sources were $Ca(NO_3)_2$, $CaCl_2$, $CaSO_4$, $MgCl_2$, $Mg(NO_3)_2$, and $MgSO_4$. The calcium sulfate was applied dry because of its low aqueous solubility. Ammonia evolved from the surface was collected until the percent nitrogen was less than about 1% per day based upon the originally applied nitrogen. The collection apparatus was that described in Fenn and Kissel "Ammonia Volatilization from Surface Applications of Ammonium Compounds on Calcareous Soils: I. General Theory.", Soil SCI. SOC. AMER. PROC. 37: 855–859 (1973).

Figure 2:
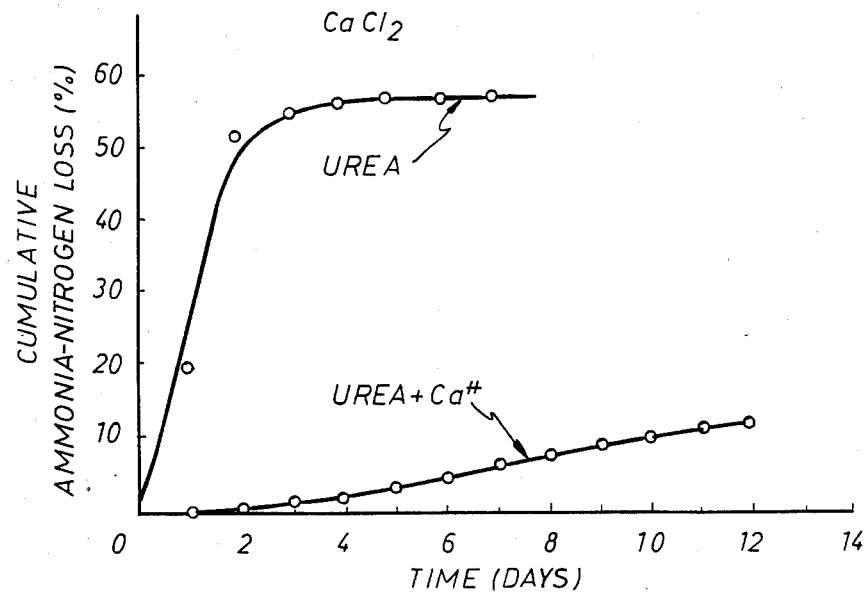
FIG. 2 illustrates in graphic form the reductive effect of added calcium to urea fertilizer surface applied to a Darco fine sand soil, over a period of days.
Figure 2:
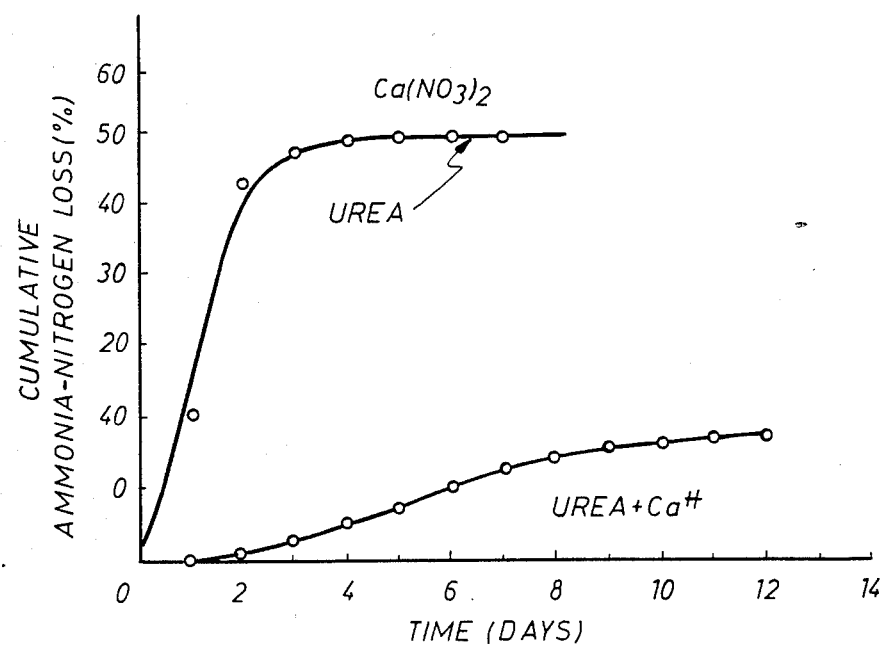
Figure 3:
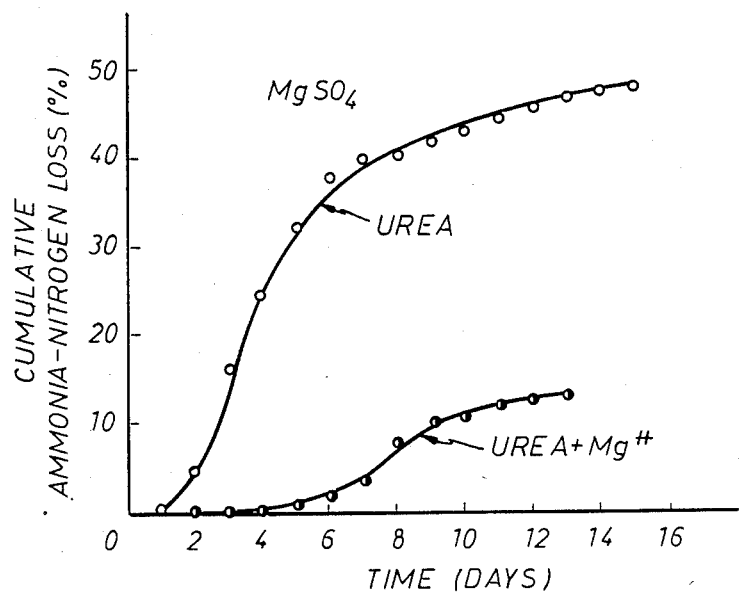
FIG. 3 graphically depicts the reductive effect of added magnesium sulfate and calcium nitrate salts on cumulative ammonia loss from urea broadcast on Beaumont clay soil.
Figure 3:
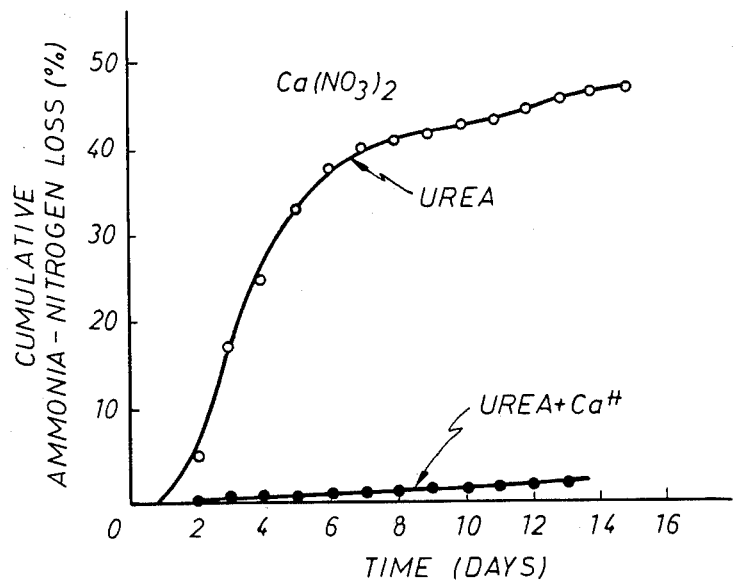

The accompanying drawings show the reductive effects of added calcium and magnesium salts on ammonia loss from urea, depending upon the particular source of calcium and/or magnesium. Losses for $MgCl_2$ are not shown but were identical to those from $CaCl_2$. It will be noted that losses from urea applied alone were the greatest, ranging from 76% in Harkey sicl (FIG. 1) to 50-60% from the other soils (FIGS. 2 and 3). No differences were found in ammonia loss from soils treated with urea in combination with either $CaCl_2$ or $Ca(NO_3)_2$. The calcium sulfate resulted in ammonia losses of 71% of applied nitrogen, which is not significantly less than the 76% loss found with urea alone (FIG. 1).

The ammonia loss from Darco fs occurred very rapidly, leveling off at about 60% applied nitrogen (FIG. 2). The addition of a chemically equivalent amount of calcium to the fertilizer reduced losses to 10-15% overall and resulted in a much slower loss rate. The same effect was observed with the Beaumont clay soil, the maximum loss with the urea applied alone being about 46%, but less than 3% with the addition of soluble calcium (FIG. 3).

Ammonia volatilization loss from urea on Harkey sicl in the presence of $CaSO_4$ reduced very little, as shown in FIG. 1. However, magnesium sulfate applied with urea on a Beaumont clay was almost as effective as either the calcium chloride or calcium nitrate in reducing $NH_3$ loss.

In another series of experiments, the effect on soil pH of adding soluble calcium salt to the fertilizer was measured. A fixed amount of a calcium salt was added to 26.6 gm of soil and pH measured. Then a chemically equivalent amount of ammonium carbonate was added and pH values again measured, at several different times up to 72 hours. The reason ammonium carbonate was used instead of urea was that under most circumstances urea will hydrolyze to a sufficient degree only over a three to five day period. Table 1 reflects the measured surface soil pH values over the given period.

TABLE 1

| | | | | Soil pH after | | |
|---|---|---|---|---|---|---|
| Soil | Salt | $(NH_4)_2CO_3.H_2O$ | Initial pH | 4 | 24 hrs | 72 |
| Harkey sicl | | | | | | |

Surface soil pH values as affected by 1.96 g of $(NH_4)_2CO_3.H_2O$ and an equivalent amount of Ca added to 26.6 g of soil.

TABLE 1-continued

Surface soil pH values as affected by 1.96 g of
$(NH_4)_2CO_3.H_2O$ and an equivalent amount of Ca
added to 26.6 g of soil.

| Soil | Salt | $(NH_4)_2CO_3.H_2O$ | Initial pH | Soil pH after 4 hrs | 24 hrs | 72 hrs |
|---|---|---|---|---|---|---|
| Soil | — | — | 7.7 | | | |
| Soil | — | + | 8.4 | 8.8 | 9.1 | 9.2 |
| Soil + CaCl$_2$ | 2.55 | — | 6.5 | | | |
| Soil + CaCl$_2$ | 2.55 | + | 5.3 | 5.7 | 6.0 | 6.3 |
| Soil + Ca(NO$_3$)$_2$ | 2.81 | — | 6.6 | | | |
| Soil + Ca(NO$_3$)$_2$ | 2.81 | + | 5.8 | 6.6 | 7.5 | 8.0 |
| Soil + CaSO$_4$ | 3.00 | — | 7.7 | | | |
| Soil + CaSO$_4$ | 3.00 | + | 7.0 | | 7.1 | |
| Darco fs | | | | | | |
| Soil | — | — | 5.8 | | | |
| Soil | — | + | 8.6 | | 9.1 | |
| Soil + CaCl$_2$ | 2.55 | — | 4.6 | | | |
| Soil + CaCl$_2$ | 2.55 | + | 5.8 | | 7.2 | 6.9 |
| Soil + Ca(NO$_3$)$_2$ | 2.81 | — | 4.5 | | | |
| Soil + Ca(NO$_3$)$_2$ | 2.81 | + | 6.5 | | 7.8 | 7.7 |
| Beaumont c | | | | | | |
| Soil | — | — | 4.8 | 5.0 | 5.0 | 4.9 |
| Soil | — | + | 8.6 | | | 8.8 |
| Soil + CaCl$_2$ | 2.55 | — | 3.9 | | | |
| Soil + CaCl$_2$ | 2.55 | + | 5.7 | 5.6 | 5.8 | 6.0 |
| Soil + Ca(NO$_3$)$_2$ | 2.81 | — | 3.9 | | | |
| Soil + Ca(NO$_3$)$_2$ | 2.81 | + | 6.3 | 6.3 | 6.6 | 6.9 |

With reference to Table 1, it will be observed that the addition of CaCl$_2$ or Ca(NO$_3$)$_2$ alone reduced soil pH by greater than one unit from the native pH of 7.7. The soil pH value with CaSO$_4$ alone was identical to that of the native soil. When the salt was added in combination with the ammonium carbonate, the pH was initially depressed even further, despite the fact that addition of the carbonate alone caused an increase. However, the total overall pH depression with the combined calcium sulfate and ammonium carbonate application was less than 0.8 unit. This significant difference indicates the formation of large quantities of the acid salts ammonium chloride (NH$_4$Cl) and ammonium nitrate (NH$_4$NO$_3$) following addition of ammonium carbonate to soil containing CaCl$_2$ or Ca(NO$_3$)$_2$. However, after this significant unitial pH depression, it should be noted that soil pH values had increased within 72 hours to 8.0 with calcium nitrate and 6.3 with calcium chloride.

The addition of soluble calcium alone to acid Darco fs soil also significantly reduced the soil pH, to 4.6 and 4.48 with CaCl$_2$ and Ca(NO$_3$)$_2$, respectively, from the native soil pH of 5.84. Soil pH with ammonium carbonate alone was 8.6, increasing to 9.13 within 24 hours. However, addition of the same amount ammonium carbonate in the presence of the soluble calcium produced soil pH values of 6.85 and 7.67, respectively, even after as much as 72 hours.

Ammonium carbonate applied to calcium-treated Beaumont clay resulted in a much lower final soil pH, consistent with a highly acidic native pH of 4.84. Similarly, as with the Darco soil, when the ammonium carbonate was added to Beaumont clay without the calcium salt, it immediately raised the pH to 8.7. The addition of soluble calcium values alone reduced soil pH, in the absence of ammonium carbonate, to 3.90. However, combining the ammonium carbonate with the soluble calcium values resulted in much lower pH values in the Beaumont clay soil than in either the Darco or in the calcareous Harkey. These pH values, even after 72 hours, were 5.99 for CaCl$_2$ and 6.85 for Ca(NO$_3$)$_2$.

These samples illustrate how the addition of calcium and/or magnesium in the form of a highly soluble salt such as CaCl$_2$ or Ca(NO$_3$)$_2$ produces a significant reduction in ammonia loss from all soils. This reduction actually occurs as a result of two different phenomena: the precipitation of the insoluble carbonate at pH values above 7, and H$_2$CO$_3$ decomposition in the acid soils. The effect of either of these phenomena, or both in combination, is to minimize ammonia volatilization. Expression of this effect would depend, at least initially, on the type of soil and on the urease activity within the soil. The initial pH would be determined by concentration of the calcium/magnesium salts in combination with the native pH of the soil. Each succeeding amount of ammonium carbonate produced by hydrolysis of the urea may further reduce the pH through the formation of acid salts. Consumption of the added calcium/magnesium in the form of the carbonate precipitation, however, lessens the induced pH reaction. These results also showed that the less soluble calcium salts, such as calcium sulfate (CaSO$_4$), are not effective in minimizing ammonia volatilization loss. Even though a considerable tendency exists for carbonate precipitation from a solution of ammonium carbonate and calcium sulfate, it is still not sufficient to effectively suppress ammonia loss.

Acid soils will have little permanent calcium carbonate since land preparation and rain fall would result in its loss. Calcium carbonate produced from the application of soluble calcium tends to exist only on the surface of an acid soil. The significant loss of soluble and exchangeable calcium and magnesium from Harkey sicl showed that these cations readily disappear in the presence of urea. Presence of carbonate and the loss of calcium and magnesium can only suggest formation of calcium carbonate. This study relies strongly on indirect soil evaluations to indicate this. Radioactive carbon-14 tracing would be necessary to precisely quantify the CO$_3$ formation, but considering the evidence presently available, calcium carbonate is probably formed in all three types of soils.

It will be noted from FIGS. 1–3 that ammonia loss from ammonium nitrate in the presence of calcium was reduced. The percentage reduction was less than with ammonium sulfate. The likely mechanism of this loss reduction is the depression of soil pH.

Parameters

The effect of soluble calcium on reducing ammonia volatilization loss from urea appears to be the result of three independent phenomena: first, at a Ca/N ratio of 0.25, insoluble carbonate is precipitated; second, any extra calcium not precipitated reduces soil pH, inhibiting urea hydrolysis; and thirdly, the presence of calcium appears to further reduce the rate of urea hydrolysis through the formation of some type of complex between the urea and the precipitated carbonate. It is believed the urea may take the place of water of hydration around the calcium molecules when the calcium is released from the clay particles and organic matter. Urea hydrolysis becomes slow enough that nitrification and its acid production begins to convert ammonium ions to soluble HNO$_3$, which reacts with calcium carbonate to form Ca(NO$_3$)$_2$. This reintroduces soluble calcium into the system, and tends even further to minimize the obvious calcium requirement.

The role of soluble calcium/magnesium in reducing ammonia loss from soil by way of carbonate precipitation and soil pH depression can be further appreciated by comparing the effect of increasing rates of urea application at various ratios of calcium/magnesium cation to urea nitrogen. Investigations have indicated that soil pH, Ca/Mg precipitation, and the rate of hydrolysis of added urea are all related to reduction of ammonia loss.

Calcium/nitrogen ratios of 0.25 appear to be equally effective in reducing ammonia loss independent of nitrogen application rates. Higher ratios of Ca/N at 55 and 110 kg nitrogen per Hectare application rates do not further depress ammonia loss. At application rates of 550 and 1100 kg nitrogen per Hectare, calcium levels above a Ca/N ratio of 0.25 resulted in additional large depressions of ammonia loss. This additional effect was due to a depression in soil pH from increased calcium activity and a dramatically reduced rate of urea hydrolysis. The chemical reaction of calcium with urea was complete at a Ca/N ratio of 0.25. Additional calcium, up to a ratio of 1.0, if added with a high enough rate of urea (such as 550 and 1100 kg nitrogen per hectare), will remain soluble and reduce the soil pH, thus being responsible for up to one-half of the total reduction in ammonia loss.

The effectiveness of the cation, calcium/magnesium, in ammonia loss reduction will depend upon the ratio of chemical equivalents to urea nitrogen. If the equivalents of calcium or magnesium are less than the equivalents of urea nitrogen, then the cation can be extensively precipitated as the carbonate. However, if the equivalents of the cation equal or slightly exceed the urea nitrogen concentration, then only a small amount will be precipitated as the carbonate. If the concentration of the cation is high enough, the soil pH values may be reduced low enough to cause carbonate loss as $CO_2$. In the case of lower rates of cation application, the pH of the soil will not be adequately depressed to direct the loss through this mechanism. At lower rates, the major pathway for $CO_3$ loss and ammonia loss reduction will be by carbonate precipitation.

Figure 4:
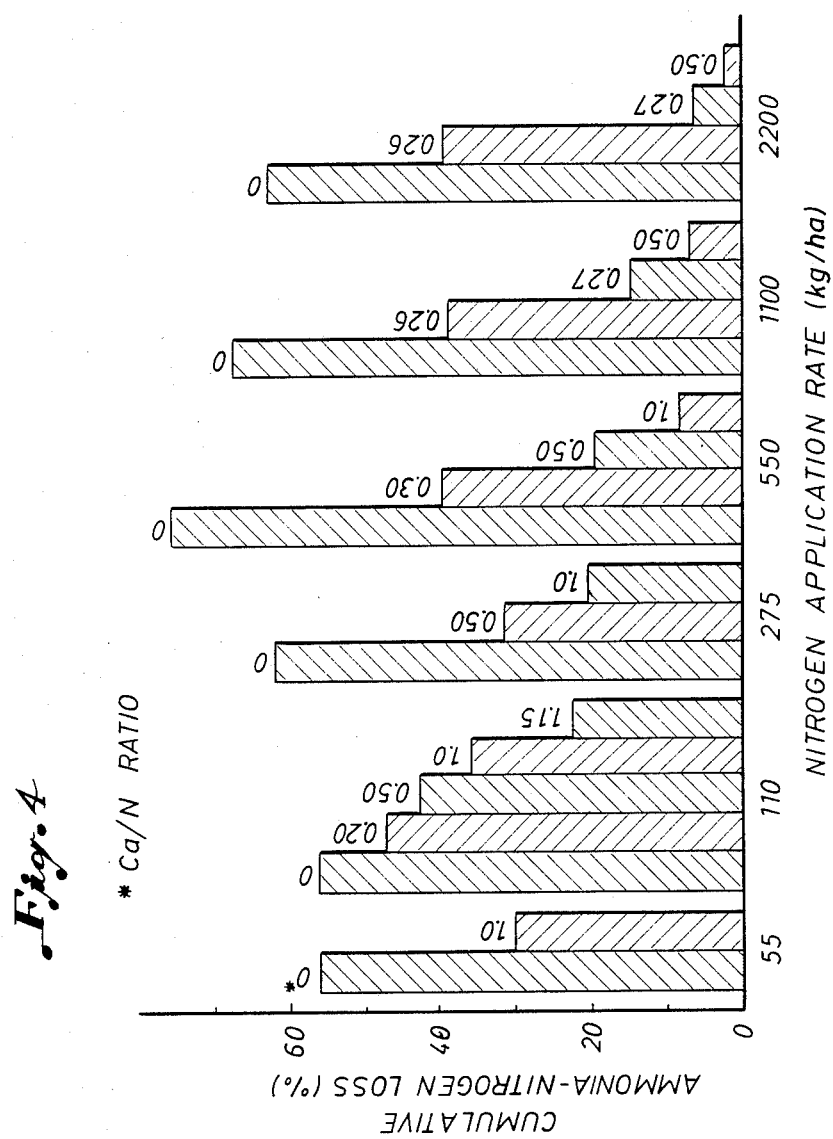
FIG. 4 illustrates the significance of the change in Ca/N ratio on cumulative ammonia loss at different rates of application of compositions formulated according to the present invention.

The influence of the ratio of calcium/magnesium to urea nitrogen equivalents at various levels of urea on the ammonia lost from a sample of Harkey sicl is demonstrated by the results of laboratory and greenhouse experiments, reproduced in FIG. 4. In a broadcast application of urea with calcium, higher rates of calcium are required at the lowest nitrogen application rates. At 55 and 110 kg nitrogen per hectare, a calcium/nitrogen equivalent ratio of 1.0 reduced ammonia loss to approximately 30–35% of applied nitrogen. However, at 275 kg nitrogen per hectare and a Ca/N ratio of 0.50, ammonia loss was reduced more than at the Ca/N ratio of 1.0, with lower nitrogen rates. Progressively increasing the total amount of nitrogen resulted in a progressive decrease in the ratio of Ca/N required to reduce ammonia loss to less than 10% of applied nitrogen.

Addition of urea to the soil surface without any soluble calcium at 110 and 550 kg nitrogen per hectare generally reduced the adsorbed and soluble calcium and magnesium in the soil by approximately 25% of the equivalent nitrogen added.

The loss of ammonia for the lower nitrogen application rates was affected most by added calcium at a Ca/N ratio of 0.25. Additional calcium had little additional reductive effective on ammonia loss. However, as the rates of nitrogen application gradually increased, the effect of additional calcium became more and more important in reducing ammonia loss. Significant reductions in soil pH values were observed at higher nitrogen application rates with higher ratios of soluble calcium. The breaking point for rapid decreases in ammonia loss occurred at Ca/N ratios between 0.27 and 0.30 at these higher nitrogen application rates. It was apparent that a small amount of calcium significantly reduced soil pH and accordingly dramatically reduced additional ammonia loss. The extra quantity of calcium applied, however, is equal to a Ca/N ratio of 1 at 55 kg nitrogen per hectare and 0.50 at 110 kg nitrogen per hectare. At higher nitrogen application rates, smaller increases in the Ca/N ration resulted in substantial pH depression. These pH reductions are an additional system for reducing ammonia losses.

The pH depression of calcareous soil by addition of soluble calcium is reported by Turner & Clark in Volume 82 of *Soil Science*, pp. 337–341 (1956) to be:

$$pH = -\tfrac{1}{2} \log Ca - \tfrac{1}{2} pCO_2 + K$$

If applied on the soil surface, the calculated value of $[\tfrac{1}{2} \log pCO_2 + K]$ yields approximately 6.73. The working equation for surface applications of soluble calcium, therefore, will be considered to be: $pH = 6.73 \tfrac{1}{2} \log (Ca)$. Up to approximately $\tfrac{1}{2}$ of the total ammonia loss in calcareous soils may be the result of the reduced pH effect. The greater the nitrogen application rate, the closer the Ca/N ratio approaches 0.25 for acceptable reduction of both pH and ammonia loss.

Experiments to Determine Effect On Plant Growth

Experiments were conducted on bermudagrass and great white northern beans to demonstrate the dramatic plant growth stimulation produced by the present invention. Specifically, the experiments on these plants demonstrate that addition of calcium to urea fertilizer increases nitrogen utilization by the plant, resulting in improved plant growth.

EXAMPLE 1

Experiments were conducted in 1979 and 1980 on common bermudagrass (*Cynodon dactylon* L.) along golf course fairways and in 1981 on commercial lawn consisting of Santa Ana bermudagrass (Cynodon sp.). The soils were calcareous, fine-textured desert sands with a pH range of 8.0–8.2. Color intensity and verdure density (top growth below the 2.5 cm mowing height) were evaluated on a scale of 1–9, with 9 indicating the darkest green color and greatest verdure density.

In 1979 and 1980, comparisons were made between treatments of urea and treatments of four parts urea-nitrogen plus one part calcium nitrate nitrogen $[Ca(NO_3)_2 \cdot 4CO(NH_2)_2]$. In 1981, the turfgrass was treated with four parts urea nitrogen to one part calcium nitrate nitrogen and methylene urea. A nitrogen rate of 0.70 kg N/are (are = 100 sq. m) was applied in 1979. Nitrogen rates of 0.70 kg N/are and 1.0 kg N/are were applied in 1980. Those plots receiving 0.70 kg N/are received a second nitrogen application 8–10 weeks later. In 1981, the nitrogen application rate was 0.75 kg N/are, with subsequent application 10 and 19 weeks later.

In 1979, turfgrass color and quality evaluations were made on May 28, June 4, June 11, July 31, August 7 and October 9. In 1980, weekly evaluations were initiated on June 9. In 1981, weekly evaluations were initiated on May 15.

The color intensity scores for 1979 and 1980 are set out in Tables 1–3 below.

TABLE 1

Color intensity (1 to 9 scale) scores of common bermudagrass in 1979 under 0.70 kg nitrogen/are. Fertilizers applied May 1 and July 12.

| Fertilizer Treat. | May 28 | June 4 | June 11 | July 31 | Aug 7 | Oct 9 |
|---|---|---|---|---|---|---|
| | | | Color | | | |
| Urea | 3.3 bcd[z] | 3.5 a | 4.0 a | 4.0 ab | 2.8 bc | 3.5 ab |
| Calcium + 4 (Urea) | 3.5 a | 4.3 a | 4.3 a | 4.3 a | 3.3 ab | 4.3 a |

[z]Mean separation in columns by Duncan's multiple range test, 5% level.

TABLE 2

Color intensity (1 to 9 scale) scores for odd numbered weekly evaluations of common bermudagrass in 1980 under 0.70 kg nitrogen/are. Fertilizers applied May 30 and August 1.

| Fertilizer Treat. | 1 | 3 | 5 | 7 | 9 | 11 | 13 | 15 |
|---|---|---|---|---|---|---|---|---|
| | | | | Color | | | | |
| Urea | 2.25 | 3.75 | 3.25 | 3.50 | 3.0 | 3.25 | 3.00 | 2.25 |
| Calcium + 4 (Urea) | 2.75 | 4.25 | 5.25 | 5.25 | 4.75 | 4.75 | 3.75 | 3.75 |

TABLE 3

Color intensity (1 to 9 scale) scores for odd numbered weekly evaluations of common bermudagrass in 1980 under 1.0 kg nitrogen/are. Fertilizers applied May 30.

| Fertilizer Treat. | 1 | 3 | 5 | 7 | 9 | 11 | 13 | 15 |
|---|---|---|---|---|---|---|---|---|
| | | | | Color | | | | |
| Urea | 2.50 | 4.50 | 4.50 | 4.00 | 3.25 | 3.00 | 2.50 | 1.50 |
| Calcium + 4 (Urea) | 1.75 | 4.50 | 4.75 | 5.00 | 4.50 | 4.75 | 4.75 | 4.25 |

Color intensity scores for urea plus calcium in 1979 were consistently higher than those for urea alone. There was a general decline in color levels for both treatments after August 7, probably due to declining soil nitrogen supply.

The 1980 data were similar. Scores for urea plus calcium were consistently higher than the scores for urea alone at both application rates.

The verdure density scores for 1980 are set out in Tables 4 and 5 below.

TABLE 4

Verdure density (1 to 9 scale) scores for odd numbered weekly evaluations of common bermudagrass in 1980 under 0.70 kg nitrogen/are. Fertilizers applied May 30 and August 1.

| Fertilizer Treat. | 1 | 3 | 5 | 7 | 9 | 11 | 13 | 15 |
|---|---|---|---|---|---|---|---|---|
| | | | | Color | | | | |
| Urea | 2.50 | 3.75 | 3.00 | 3.50 | 3.00 | 3.50 | 3.25 | 3.25 |
| Calcium + 4 (Urea) | 1.75 | 4.00 | 3.50 | 4.25 | 3.75 | 4.25 | 3.50 | 3.75 |

TABLE 5

Verdure density (1 to 9 scale) scores of common bermudagrass in 1980 under 1.0 kg nitrogen/are. Fertilizers applied May 30.

| Fertilizer Treat. | 1 | 3 | 5 | 7 | 9 | 11 | 13 | 15 |
|---|---|---|---|---|---|---|---|---|
| | | | | Color | | | | |
| Urea | 2.25 | 3.75 | 4.00 | 3.75 | 3.50 | 2.75 | 2.75 | 2.25 |
| Calcium | 2.00 | 4.00 | 3.75 | 4.00 | 3.50 | 4.00 | 4.25 | 4.25 |

TABLE 5-continued

Verdure density (1 to 9 scale) scores of common bermudagrass in 1980 under 1.0 kg nitrogen/are. Fertilizers applied May 30.

| Fertilizer Treat. | 1 | 3 | 5 | 7 | 9 | 11 | 13 | 15 |
|---|---|---|---|---|---|---|---|---|
| | | | | Color | | | | |
| + 4 (Urea) | | | | | | | | |

Like the data for color intensity, treatment with urea plus calcium generally yields greater verdure density than the density resulting from treatment with urea alone. Results with the 0.70 kg nitrogen/are application rate were more dramatic.

In 1981, composite turfgrass quality scores, composed of color intensity and verdure density, were compiled as shown below in Table 6.

TABLE 6

Turfgrass quality (1–9 scale) scores of Santa Ana bermudagrass in 1981 under 0.75 kg nitrogen/are. Fertilizers applied on May 8, July 16 and Sept. 9.

| Fertilizer Treat | May 15 | June 5 | July 6 | Aug 3 | Sep 1 | Sep 28 |
|---|---|---|---|---|---|---|
| Calcium + 4 (Urea) | 3.0 a[z] | 3.8 a | 3.0 a | 5.3 a | 5.0 a | 4.3 a |
| Methylene Urea A | 2.3 b | 3.0 b | 2.5 a | 4.0 b | 4.3 b | 4.3 a |
| Methylene Urea B | 2.5 ab | 3.5 ab | 2.8 a | 4.0 b | 4.8 ab | 4.3 a |

[z]Mean separation in columns by Duncan's multiple range test, 5% level.

These quality scores for treatment with calcium plus urea are consistently higher than those for urea alone.

Also in 1981, root, rhizome and verdure dry matter (in grams) for each plot were measured by taking two sod-soil cores per plot on July 15, September 9, and October 26 using an 11 cm cup cutter. The turfgrass biomass samples were handwashed to remove the soil fraction, with subsequent separation to root plus rhizome and verdue. These parts were then oven dried at 55° C. and weighed. The results are compiled in Table 7.

TABLE 7

Root, rhizome, and verdure (topgrowth) turfgrass dry matter (g) harvested from Santa Ana bermudagrass plots in 1981 under 0.75 kg nitrogen/are. Fertilizers applied May 8, July 16 and Sept. 9.

| Fertilizer Treat | Root and Rhizome | | | Verdure (Topgrowth) | | |
|---|---|---|---|---|---|---|
| | July 15 | Sept 9 | Oct 26 | July 15 | Sept 9 | Oct 26 |
| Calcium + 4 (Urea) | 50.2 a[z] | 31.4 a | 33.5 a | 3.6 ab | 3.9 b | 5.6 a |
| Methylene Urea A | 31.1 b | 20.1 b | 24.0 b | 3.6 ab | 3.6 b | 4.9 bc |
| Methylene Urea B | 28.5 b | 26.3 a | 25.5 b | 4.0 a | 5.1 a | 4.4 c |

[z]Mean separation in columns by Duncan's multiple range test, 5% level.

This dry matter data demonstrates that the addition of calcium actually enhanced nitrogen utilization by causing the turfgrass plant to increase root and rhizome biomass production. Total biomass production increased through more efficient utilization of the available growth resources. Later in the season, when the soil nitrogen resource has been expended, the plant apparently reallocates stored energy resources to maintain topgrowth and visual quality. This may be seen by the convergence of the later data for the root and rhizome masses.

EXAMPLE 2

Greenhouse experiments were conducted with commercial quartz sand to which was added either no $CaCO_3$ (acidic sand) or 5% $CaCO_3$ (calcareous sand) by weight. The sand was placed in 4 liter pots filled to within 2 cm of the top and great white northern beans (*Phaseolus vulgaris L.*) planted. Equal numbers of seed were planted per pot (in each of 10 replicates) and thinned to an equal number of plants. Continuous experiments were established and harvested on 2 to 3 month schedules. The pots were watered with a sulfate base nutrient solution similar to that used by Wallace (Wallace and Ashcroft "Preliminary Comparison of the Effect of Urea and Other Nitrogen Sources on the Mineral Composition of Rough Lemon and Bean Plants", PROC. AMER. SOC. HORT. SCI. 66:227–33 (1956)). Nitrogen level was 10 mM/l with Ca levels of 0, 2.5, 5 and 16 mM/l in addition to the soluble Ca found in the sand. One treatment (16 mM/l Ca) received 50 g $CaSO_4$/pot/week to produce a continuous saturated $CaSO_4$ environment. The nutrient solution also contained 0.3 mM/l P, 5 mM/l K, 2 mM/l Mg, 5 ppm Fe, 0.5 ppm Zn, Mn and B, and 0.25 ppm Cu. Nutrient solutions were added twice daily after seedling emergence. The pots were leached periodically with 2 pore volumes of distilled water. The leachate was collected after missing 2 to 4 waterings and analyzed for its residual $NH_4$ concentration. The beans were grown for approximately 2 to 3 months after which tops and roots were harvested, dried and weighed. Foliar and root masses were recorded as oven dry weights.

The results of five experiments in calcareous sand are tabulated below in Tables 1 and 2. Table 1 shows the dry matter measurements for foliar, root and total dry matter at soil solution calcium concentrations of 7, 10, 14 and 16 mM/l. Table 2 shows residual ammonium concentration levels for the same soil solution calcium concentrations.

TABLE 1

| | Dry matter measurements for calcareous sand (grams). | | | | |
|---|---|---|---|---|---|
| Exp. No. | | Soil Solution Calcium Concentration (mM/l) | | | |
| & Date | | 7 | 10 | 14 | 16 |
| 1 | Roots | 4.20 a[z] | 8.90 b | 10.77 c | 8.61 b |
| 3/3/82 | Foliar | 10.70 a | 12.07 a | 12.33 a | 10.12 a |
| | Total | 14.90 a | 20.97 b | 23.10 c | 18.73 b |
| 2 | Roots | 1.48 a | 1.45 a | 1.73 a | 2.62 b |
| 5/28/82 | Foliar | 4.95 a | 3.70 b | 3.74 b | 7.02 c |
| | Total | 16.43 a | 5.15 b | 5.47 b | 9.64 c |
| 3 | Roots | 1.13 a | 2.32 b | 2.84 c | 2.66 c |
| 5/28/82 | Foliar | 3.13 a | 5.86 b | 6.12 b | 6.12 b |
| | Total | 4.26 a | 8.18 b | 8.96 c | 8.78 c |
| 4 | Roots | 2.11 a | 2.58 a | 2.14 a | 2.32 a |
| 9/29/82 | Foliar | 9.59 a | 11.21 b | 9.41 a | 9.34 a |
| | Total | 11.70 a | 13.79 b | 11.55 a | 11.66 a |
| 5 | Roots | 1.51 a | 1.50 a | 2.57 b | 1.88 a |
| 1/10/83 | Foliar | 6.17 a | 6.73 a | 7.86 b | 7.89 b |
| | Total | 7.68 a | 8.23 a | 10.43 b | 9.77 b |

[z]Mean separation in columns by Duncan's multiple range test, 5% level.

TABLE 2

| | Residual ammonium ($NH_4$) concentration levels for calcareous sand (mM/l). | | | | |
|---|---|---|---|---|---|
| Exp. No. | Meas. | | Soil Solution Calcium Concentration (mM/l) | | |
| & Date | Date | 7 | 10 | 14 | 16 |
| 1 | 3/10/82 | 3.3 a[z] | 2.2 a | 0.4 b | 0.2 b |
| 3/31/82 | 3/23/82 | 11.5 a | 10.7 a | 10.7 a | 6.8 b |
| 2 | 5/19/82 | 3.5 a | 4.5 a | 4.3 a | 2.2 c |
| 5/28/82 3 | 5/19/82 | 5.5 a | 2.6 b | 0.0 c | 3.9 d |
| 5/28/82 4 | — | — | — | — | — |
| 9/29/82 5 | — | — | — | — | — |
| 1/10/83 | | | | | |

[z]Mean separation in columns by Duncan's multiple range test, 5% level.

In experiment 1, foliar dry matter increased 16% with increasing soil solution Ca concentrations (Ca) from 7 to 14 mM/l and decreased 30% with a Ca increase to 16 mM/l. Root dry matter increased 155% with increasing Ca from 7 to 14 mM/l and then decreased 17% when Ca increased from 14 to 16 mM/l. Total dry matter reflected the changes in tops and roots.

As shown in Table 2 for experiment 1, as Ca increased, residual solution $NH_4$ levels dropped as a result of greater $NH_4$ absorption. This decrease closely followed the increasing Ca levels on 3-10-82. On 3-23-82, there was an initial drop followed by little change and then a substantial reduction in measured $NH_4$ at 16 mM/l Ca.

Experiment 2 followed a similar pattern except for an initial drop in foliar and total dry matter production. Root dry matter increased curvilinearly with all increases in Ca. Corresponding to the initial decrease in foliar dry matter, residual $NH_4$ initially increased as Ca was increased. Subsequent additions of Ca decreased residual $NH_4$, i.e., $NH_4$ absorption rates increased.

In experiment 3, total dry matter increased curvilinearly with Ca increases up to 14 mM/l Ca and then plateaued. Foliar and root growth followed generally the same pattern. Residual $NH_4$ dropped to 0 at 14 mM/l Ca but then increased at 16 mM/l Ca. The greatest absorption of $NH_4$ occurred at 10 mM/l Ca.

Plant growth was little affected by addition of Ca in experiment 4, probably due to high temperature conditions at that time of year.

In experiment 5, foliar, root and total dry matter followed a pattern similar to that of the earlier experiments. The greatest dry matter increases occurred between the 7 and 10 mM/l Ca concentrations, then leveled off at 16 mM/l. Ammonium absorption rates were almost equal at all Ca concentrations (not shown).

Five experiments were also conducted on the acidic sand, the results of which are shown below in Tables 3 and 4. Table 3 shows the dry matter measurements for foliar, root and total dry matter at soil solution calcium concentrations of 7, 10, 14 and 16 mM/l. Table 4 shows residual ammonium concentration levels for the same soil solution calcium concentrations.

TABLE 3

| | Dry matter measurements for acidic sand (grams). | | | | |
|---|---|---|---|---|---|
| Exp. No. | | Soil Solution Calcium Concentration (mM/l) | | | |
| & Date | | 0 | 2.5 | 5 | 16 |
| 1 | Roots | .21 a[z] | .98 b | .70 b | 1.63 c |
| 3/31/82 | Foliar | .29 a | 1.52 b | 1.23 b | 4.91 c |
| | Total | .50 a | 2.50 b | 1.93 b | 6.54 c |
| 2 | Roots | .42 a | .79 a | .63 a | 1.25 b |
| 5/28/82 | Foliar | .37 a | 1.04 a | 1.35 b | 2.41 c |
| | Total | .79 a | 1.83 b | 1.98 c | 3.66 d |
| 3 | Roots | .48 a | .43 a | .72 a | 1.18 b |

TABLE 3-continued

| | Dry matter measurements for acidic sand (grams). | | | | |
|---|---|---|---|---|---|
| Exp. No. | | Soil Solution Calcium Concentration (mM/l) | | | |
| & Date | | 0 | 2.5 | 5 | 16 |
| 5/28/82 | Foliar | .52 a | .91 a | 1.04 a | 2.55 b |
| | Total | 1.00 a | 1.34 a | 1.76 a | 3.73 b |
| 4 | Roots | .43 a | .86 b | .85 b | 1.28 c |
| 9/29/82 | Foliar | .87 a | 1.86 b | 2.70 c | 3.75 d |
| | Total | 1.30 a | 2.72 b | 3.55 c | 5.03 d |
| 5 | Roots | .23 a | .39 a | .79 b | .78 b |
| 1/10/83 | Foliar | .30 a | 1.36 b | 2.48 c | 3.50 d |
| | Total | .53 a | 1.75 b | 3.27 c | 4.28 d |

$^z$Mean separation in columns by Duncan's multiple range test, 5% level.

TABLE 4

| | Residual ammonium ($NH_4$) concentration levels for acidic sand (mM/L). | | | | |
|---|---|---|---|---|---|
| Exp. No. | Meas. | Soil Solution Calcium Concentration (mM/l) | | | |
| & Date | Date | 0 | 2.5 | 5 | 16 |
| 1 3/31/82 | 3/10/82 | 11.0 a$^z$ | 11.2 a | 11.4 a | 8.0 b |
| 2 5/28/82 | 5/19/82 | 10.3 a | 10.2 a | 9.3 b | 6.9 c |
| 3 5/28/82 | 5/19/82 | 12.2 a | 10.9 b | 10.2 c | 8.3 d |
| 4 9/29/82 | | (data lost) | | | |
| 5 1/10/83 | 1/7/83 | 11.8 a | 11.9 a | 11.2 a | 9.1 b |

$^z$Mean separation in columns by Duncan's multiple range test, 5% level.

With no added Ca, the beans grew very poorly because of a calcium deficiency. In experiment 1, there was a sharp increase in dry matter at the 2.5 mM/l Ca level, a slight decrease at 5 mM/l Ca, and then substantial increases in every case at 16 mM/l Ca. Corresponding to the increasing component plant growths, residual ammonium declined significantly from 5 to 16 mM/l Ca.

Dry matter production increased approximately linearly in experiment 2. Root and foliar dry matter both increased 200% from 2.5 to 16 mM/l Ca, with total dry matter reflecting the changes in the component parts. Residual ammonium decreased curvilinearly over the same Ca concentration range.

Foliar and root dry matter production increased 300% and 88%, respectively, in experiment 3 from 2.5 to 16 mM/l Ca. Total dry matter increased 253%, and residual ammonium declined correspondingly.

Likewise, experiment 5 yielded increasing dry matter production and declining residual ammonium with increasing Ca concentrations. Experiment 4 yielded increasing dry matter production with increasing Ca concentrations.

The urea used in the present invention can be either particle-form or powdered, or any commercially available prill. It should be understood that, where the term "urea" or "urea fertilizer" is employed throughout this specification, it is intended to include 100% standard fertilizer grade urea as well as fertilizer compositions containing a major portion of urea admixed with an inorganic nitrogen fertilizer compound.

It is preferred that the salt or salts which are to be applied with the urea to the soil surface be combined with the urea in any manner suitable to produce a particle form combination in which the several components are closely associated. The salts can be incorporated into the prills or pellets, or they can be added after particle formation by any one of several coating procedures well-known to the art.

It can also be appreciated that any one or more of the salts can be added with the urea in a water solution and then applied to the soil surface in any suitable manner such as by spraying or otherwise distributing the solution on the soil surface.

The preferred salts to be employed in the present invention are relatively highly soluble and have a generally neutral solution pH (in the range 5.0 to 8.0). More importantly, they contain, or make available by cation exchange, cations which form carbonates with a solubility product more soluble than $10^{-10}$. The soluble salts of calcium, sodium, magnesium and potassium, with saturated solution pH values in the range of about 5.6 to about 7.3, are particularly preferred.

The saturated solution pH values of some of the preferred salts are as follows:

| | Saturated Solution pH Values |
|---|---|
| Salt | Saturated Solution pH |
| $Ca(NO_3)_2$ | 6.7 |
| $CaCl_2$ | 7.2 |
| $Mg(NO_3)_2$ | 6.2 |
| $MgCl_2$ | 5.8 |
| NaCl | 5.7 |
| KCl | 6.7 |
| $KNO_3$ | 6.3 |

From the foregoing, it can be appreciated that the salts used in the present invention do not function to reduce the pH of the soil around the urea by means of their inherent acidity. Rather, it is the unique characteristic of the divalent cation, acting with the soil, which acts ultimately to produce a stable, low pH environment. In addition to those mentioned above, it will also be acceptable to employ other soluble salts, for example, those having the $NO_2^-$, $ClO_4^-$, $ClO_3^-$ and $ClO_2^-$ anions, so long as they meet the established criteria of reacting with the soil to produce insoluble carbonate.

Further, the present invention enables the use of nutritional salts such as potassium nitrate or potassium chloride with small amounts of calcium. Also, other nutrients such as phosphorous, iron or any other desired nutrient may be employed with the present invention.

In a preferred embodiment of the invention, the soil on which the urea fertilizer is to be surface applied is first analyzed to determine both the native pH and the extent to which exchangeable calcium ions are present. As has earlier been indicated, almost all soils contain exchangeable calcium. However, in some soils, the calcium is not as readily exchangeable, existing predominately in association with or adsorbed on the soil particles. The more important form of exchangeable soil calcium, for purposes of this invention will be that existing in the soil in the ionic state, readily soluble and capable of essentially immediate chemical reaction. This soluble, ionic form of calcium could be present naturally in the soil, largely as a result of associated organic matter, or it could be present as a result of prior cultivation procedures.

As will be explained in detail below, the existing state of the soil with regard to both pH and presence of exchangeable, soluble calcium will determine the most efficient application combination and procedures. For example, where little or no readily exchangeable calcium is present, it will be preferred to apply the urea fertilizer in association with a full complement of soluble calcium, that is, at a Ca/N equivalent ratio equal to at least 0.25. Such a procedure will control and minimize ammonia loss from the surface applied urea primarily by means of the carbonate precipitation mechanism and the apparent formation of a complex between the urea molecules and the precipitated carbonate.

On the other hand, in high pH calcareous soils and/or where higher rates of urea application are contemplated under circumstances where it might be expected to have the urea remain on the soil surface for longer than about 2-3 days, it might be appropriate to provide additional soluble calcium, up to a Ca/N ratio of about 1.0, in order to take advantage of the adddditional beneficial effect of pH depression through suppression of the carbonate/hydroxide buffer.

In general, in order to obtain full advantage of the ammonia volatilization loss control of the method of the present invention, it will be necessary to apply the urea with the soluble cation at a ratio of available cation to urea nitrogen equivalents of between about 0.5 to about 1.0. As will be appreciated by those skilled in this art, it will be appropriate at times to add greater amounts of the soluble salt where it is desired to provide additional amounts of a particular beneficial cation. It may also be desired, at times, to employ two or more soluble salts having different cations. Thus, where it is desired to supplement the calcium or magnesium or potassium content of the soil, the constituency of the urea fertilizer composition may be modified prior to application by adding additional soluble salt of the same or having one or more different desirable cations.

Moreover, since the pH depressing effect of the compositions of the present invention also tends to reduce ammonia volatilization loss from inorganic ammonium-based compounds, it may be desirable at times to include a minor amount of soluble ammonium fertilizer with the urea. For example, the inclusion of ammonium nitrate ($NH_4NO_3$), will provide immediately available nitrate. However, where immediate nitrate availability is desired it will probably be more preferred to employ $KNO_3$ as the soluble salt, since most crops will also benefit from the added potassium.

The foregoing description has been directed to particular embodiments of the invention in accordance with the requirements of the Patent Statutes for the purposes of illustration and explanation. It will be apparent, however, to those skilled in this art that many modifications and changes in the apparatus and procedure set forth will be possible without departing from the scope and spirit of the invention. It is applicant's intention that the following claims be interpreted to embrace all such modifications and variations.

What is claimed is:

1. The method of reducing ammonia volatilization loss from surface applied ammoniated or urea-containing soil fertilizers which comprises analyzing the soil on which said fertilizer is to be applied so as to determine the amount of available cation Y present in the soil to react in a hydrolyzing system to form carbonates having a solubility product above about $10^{-10}$ grams per liter;

applying said fertilizer to the soil surface; and applying to the soil surface in the presence of said fertilizer an effective amount of water soluble salt which has an essentially neutral solution pH and which provides in combination with any cations Y already present in the soil sufficient cations Y to suppress the formation of hydroxyl ions that would otherwise be produced in the soil according to the reaction

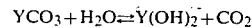
$$YCO_3 + H_2O \rightleftharpoons Y(OH)_2 + CO_2$$

with Y = calcium or magnesium;

the amount of the water soluble salt is determined by the chemical equivalents ratio (Y/N) of the calcium and magnesium (Y) provided (a) as a cation of the water soluble salt or (b) by way of cation exchange between a cation of the water soluble salt and calcium and magnesium present in the soil to the nitrogen (N) in the fertilizer, which chemical equivalents ratio (Y/N) is at least about 0.25; and the water soluble salt is formed from the $NO_3^-$ or $Cl^-$ anions.

2. The method of claim 1 wherein the chemical equivalents ratio (Y/N) is from about 0.50 to about 1.0.

3. The method of claim 2 wherein the fertilizer is urea particles.

4. The method of claim 1, 2, or 3 wherein the water soluble salt is a water soluble salt of calcium, sodium, magnesium, or potassium.

5. A method of reducing ammonia volatilization from ammoniated fertilizers and urea-containing fertilizers present on or at the soil surface after about 24–48 hours following surface application, comprising application of the fertilizer to the soil surface in the presence of a water soluble salt that (a) has a saturated solution pH of about 5.0 to about 8.0 and (b) in a hydrolyzing system with the soil and the fertilizer, will form carbonates having a solubility product above about $10^{-10}$ grams per liter, the amount of water soluble salt being sufficient to suppress the formation of hydroxyl ions that would otherwise be produced in the soil according to the reaction

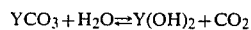
$$YCO_3 + H_2O \rightleftharpoons Y(OH)_2 + CO_2$$

with Y = calcium or magnesium;

the amount of water soluble salt is determined by the chemical equivalents ratio (Y/N) of the calcium and magnesium (Y) provided (a) as a cation of the water soluble salt or (b) by way of cation exchange between a cation of the water soluble salt and calcium and magnesium present in the soil to the nitrogen (N) in the fertilizer, which chemical equivalents ratio (Y/N) is at least about 0.25; and the water soluble salt is formed from the $NO_3^-$ or $Cl^-$ anions.

6. The method of claim 5 wherein the chemical equivalents ratio (Y/N) is from about 0.50 to about 1.0.

7. The method of claim 6 wherein the fertilizer is urea particles.

8. The method of claim 5, 6, or 7 wherein the water soluble salt is a water soluble salt of calcium, sodium, magnesium, or potassium.

* * * * *